(12) United States Patent
Saieg et al.

(10) Patent No.: US 7,740,258 B2
(45) Date of Patent: Jun. 22, 2010

(54) AIR CYLINDER PULL HANDLE RELEASE

(75) Inventors: Steven George Saieg, Rochester Hills, MI (US); Braden J. Bromley, Royal Oak, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 624 days.

(21) Appl. No.: 11/638,129

(22) Filed: Dec. 13, 2006

(65) Prior Publication Data

US 2007/0132202 A1 Jun. 14, 2007

Related U.S. Application Data

(60) Provisional application No. 60/750,000, filed on Dec. 13, 2005.

(51) Int. Cl.
*B62D 53/06* (2006.01)
(52) U.S. Cl. .................................................. 280/149.2
(58) Field of Classification Search .............. 280/149.2, 280/407.1; 180/209; 303/3, 9, 89
See application file for complete search history.

(56) References Cited

U.S. PATENT DOCUMENTS

| | | | |
|---|---|---|---|
| 4,286,797 A * | 9/1981 | Mekosh et al. ........... | 280/149.2 |
| 4,641,846 A * | 2/1987 | Ehrhart .................... | 280/149.2 |
| 4,838,566 A * | 6/1989 | Baxter et al. ............. | 280/149.2 |
| 5,199,732 A * | 4/1993 | Lands et al. ............. | 280/407.1 |
| 5,314,201 A * | 5/1994 | Wessels .................... | 280/407.1 |
| 5,476,277 A * | 12/1995 | Schueman ............... | 280/149.2 |
| 5,480,171 A * | 1/1996 | Cheffey ................... | 280/149.2 |
| 5,531,467 A * | 7/1996 | Schueman ............... | 280/149.2 |
| 6,702,310 B2 * | 3/2004 | Browning ................ | 280/149.2 |
| 7,163,220 B2 * | 1/2007 | Pappas .................... | 280/149.2 |
| 2005/0056477 A1 * | 3/2005 | Saieg et al. ................. | 180/209 |

* cited by examiner

*Primary Examiner*—Paul N. Dickson
*Assistant Examiner*—Robert A Coker
(74) *Attorney, Agent, or Firm*—Carlson, Gaskey & Olds

(57) ABSTRACT

A trailer slider assembly includes a handle that moves a trailer slider locking mechanism between an unlocked position and a locked position. A suspension side rail has a retaining feature that holds the handle in the unlocked position. A release mechanism releases the handle from the retaining feature in response to a release of a parking brake. This prevents a vehicle from driving off with the trailer slider locking mechanism in the unlocked position.

25 Claims, 5 Drawing Sheets

AIR CYLINDER PULL HANDLE RELEASE

RELATED APPLICATIONS

This application claims priority to U.S. Provisional Patent Application No. 60/750,000, which was filed Dec. 13, 2005.

TECHNICAL FIELD

This invention generally relates to a release mechanism for a trailer slider assembly that prevents an operator from moving a vehicle with the trailer slider assembly in an unlocked position.

BACKGROUND OF THE INVENTION

Trailer slider locking systems are utilized on tractor-trailers to adjust the longitudinal position of a trailer slider carrying a trailer suspension beneath a trailer body. Trailer body rails are supported on top of, and slide relative to, suspension side rails. The trailer body rails include a series of holes that provide multiple body positions relative to the trailer suspension. A mechanical linkage supported on the trailer slider, or on a suspension side rail, is used to bias spring-loaded pins to a locked position in which the pins are received in the holes in the trailer body rails. The pins lock the suspension side rail and trailer body rail together. The mechanical linkage includes a handle that is actuated by an operator to move the pins between retracted (unlocked) and extended (locked) positions.

To move the pins from the extended or locked position to the retracted or unlocked position, the operator pulls the handle outwardly away from the suspension side rail. This allows the pins to disengage from the holes such that the trailer slider can be moved to a desired position. Sometimes the operator will forget to return or release the handle from the unlocked position. If the vehicle is moved with the handle in the unlocked position, the trailer slider may slide and impact the trailer. This could cause damage to the trailer suspension or to the trailer itself.

Therefore, there is a need for a trailer slider that reliably ensures that a trailer slider handle will be moved out of the unlocked position prior to vehicle movement.

SUMMARY OF THE INVENTION

A trailer slider is adjusted by unlocking a trailer slider locking mechanism to allow the trailer slider to be moved to a desired position. Once in the desired position, the trailer slider locking mechanism is returned to a locked condition in response to the generation of a parking brake release signal. This prevents a vehicle from driving off with the trailer slider in an unlocked condition.

In one example, a trailer slider assembly includes a handle that moves the trailer slider locking mechanism between an unlocked position and a locked position. A suspension side rail has a feature for holding the handle in the unlocked position. A release mechanism releases the handle from the feature in response to a release of a parking brake.

In one example, the feature comprises an opening extending through the suspension side rail and a slot that extends from the opening. The handle is received within the opening and can be moved into the slot only when the parking brake is applied.

In one example, the release mechanism comprises an air cylinder with an extendible shaft. In response to the parking brake release signal, the extendible shaft engages the handle to move the handle out of the slot, allowing the trailer slider locking mechanism to return to the locked position.

The use of a release mechanism prevents vehicle movement with the trailer slider in an unlocked condition. The release mechanism is easily installed within existing trailer slider and suspension structures with minimal modifications to these structures. These and other features of the present invention can be best understood from the following specification and drawings, the following of which is a brief description.

DETAILED DESCRIPTION OF THE PREFERRED EMBODIMENT

Figure 1:
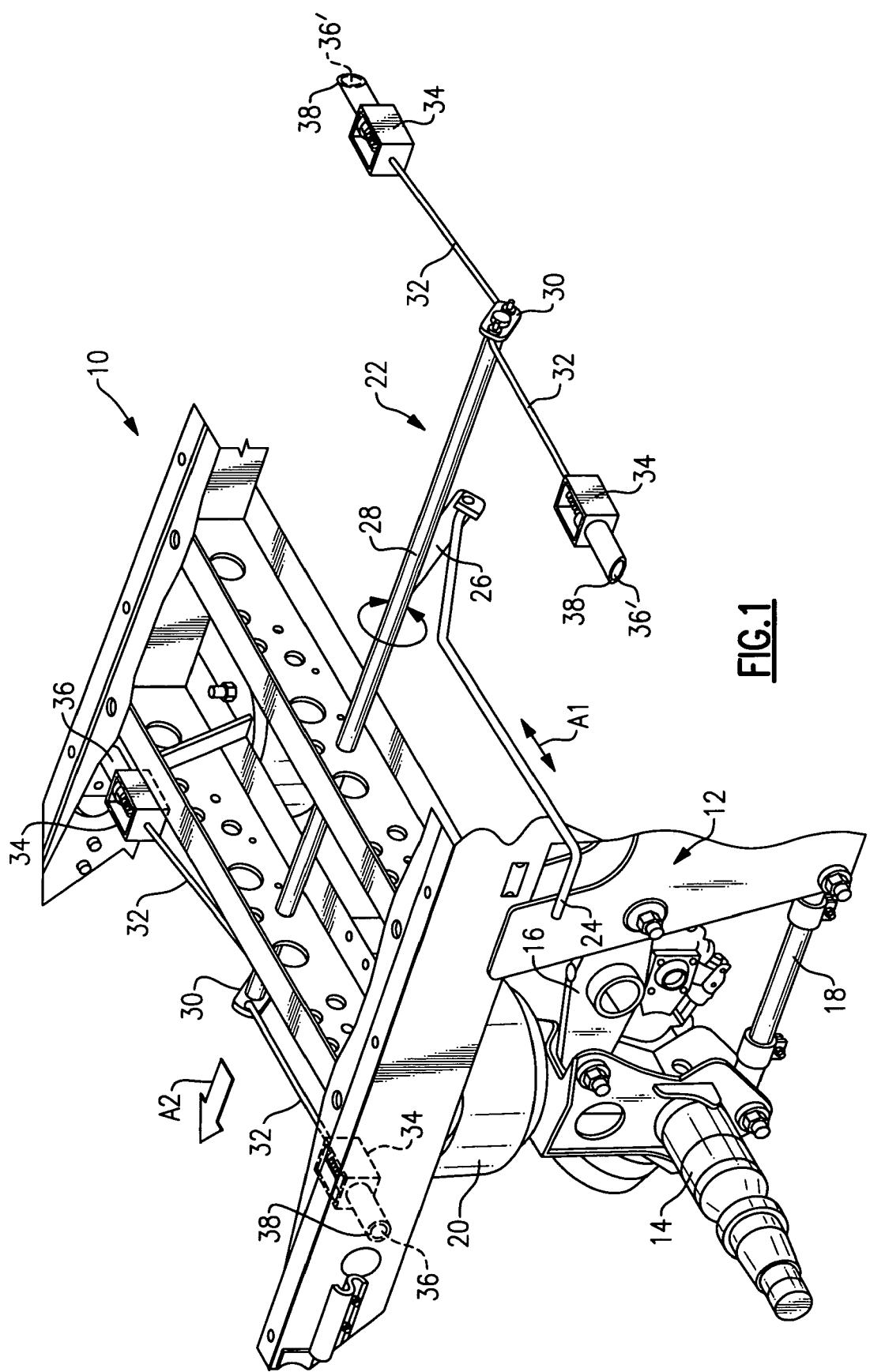
FIG. 1 is a perspective view of a trailer slider system.

FIG. 1 depicts a trailer slider system 10 including a trailer suspension frame 12 supporting an axle 14. The axle 14 is supported for articulation on the trailer suspension frame 12 by upper 16 and lower 18 control arms. An air spring 20 is arranged between the axle 14 and trailer suspension frame 12.

A pin locking system 22 is supported on the suspension frame 12. The pin locking system 22 includes a handle 24 that is moved laterally, as indicated by arrow A1, by an operator to move the pin locking system 22 between unlocked (pins retracted) and locked (pins extended) positions. When in the unlocked position, a trailer slider can be moved longitudinally, as indicated by arrow A2, to a desired position. While a manual adjustment system is shown, it should be understood that an automated or semi-automated system could also be used.

The handle 24 is connected to a crank 26 secured to shaft 28 that is rotationally supported by the trailer suspension frame 12. The shaft 28 includes a pair of cam mechanisms 30 each of which pivotally support ends of linkages 32. Cages 34 are secured to the trailer suspension frame 12 to house pins 36, 36'. The linkages 32 move the pins 36, 36' between retracted and extended positions in response to manipulation of the handle 24. While the arrangement of four pins 36 as shown is typical, fewer or additional pins may also be used.

The pins 36, 36' of the pin locking system 22 are each configured with an angled tip 38 to provide better pin engagement. The description and operation of these pins 36, 36' is set forth in application Ser. No. 11/248,038 filed on Oct. 12, 2005, which is owned by the assignee of the present invention, and is herein incorporated by reference.

Figure 2:
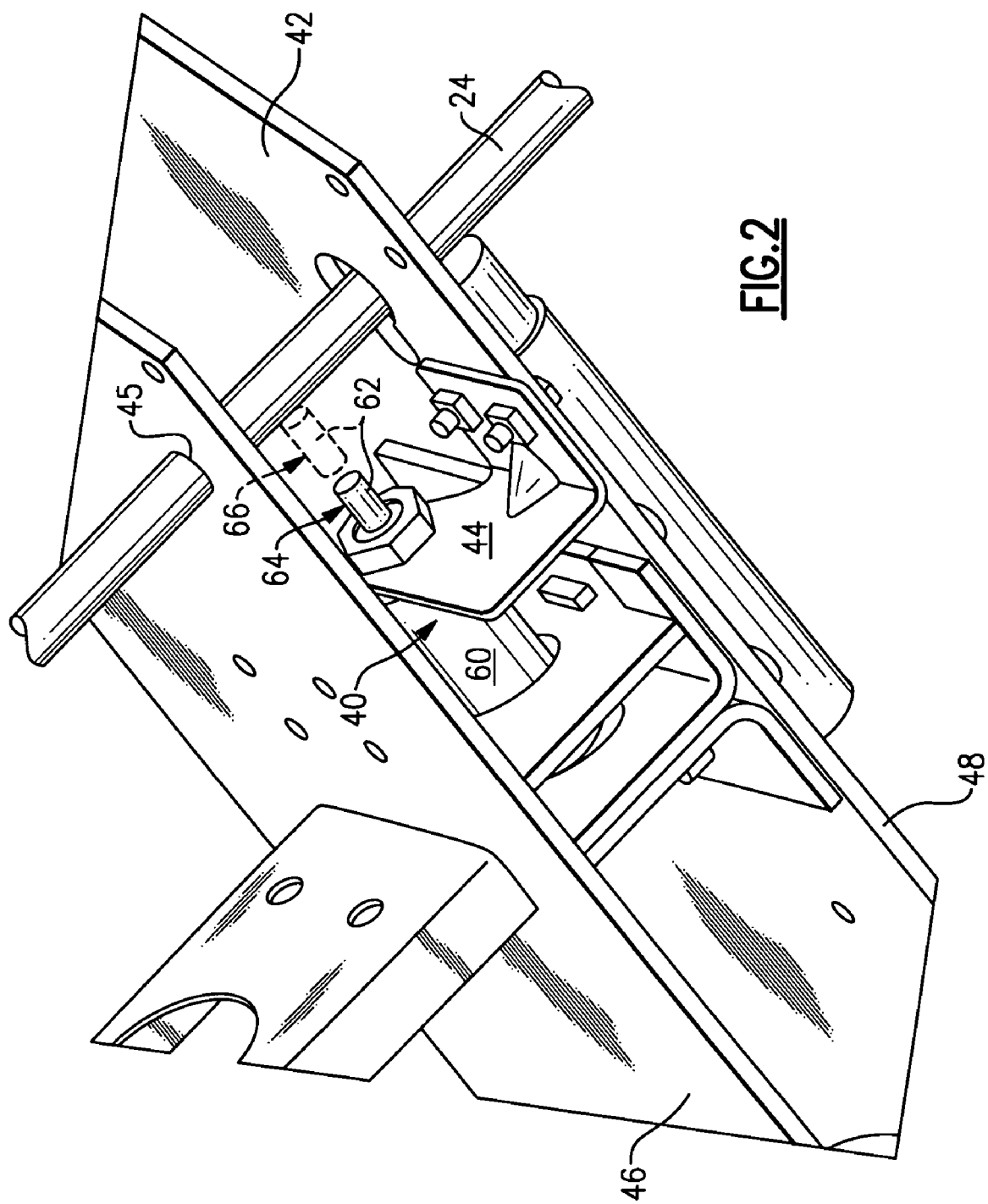
FIG. 2 is a perspective view of a locking system with a release mechanism incorporating the subject invention.

The pin locking system 22 includes a release mechanism 40 that is shown in FIG. 2. The release mechanism 40 is used to prevent the handle 24 from inadvertently being left in the unlocked position. The suspension configuration shown in FIG. 1 is only exemplary, and one of ordinary skill in the art will understand that the subject release mechanism 40 could be used with any suspension configuration. Further, the release mechanism 40 is shown used in combination with pins 36, 36' that have angled tips 38, however, the release mechanism 40 could also be used with other types of pin configurations.

Figure 3A:
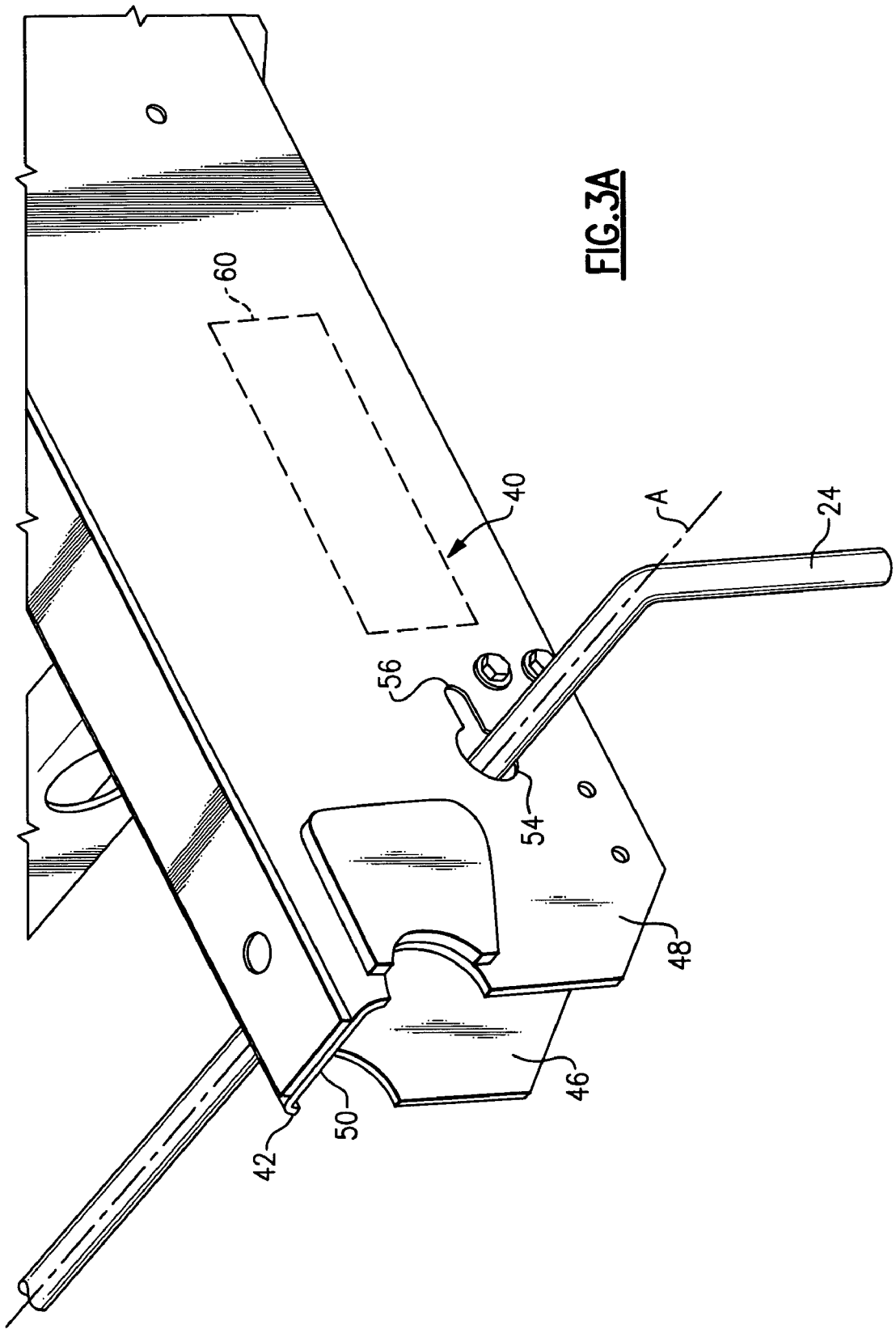
FIG. 3A is a perspective view showing a handle in a locked position.
Figure 3B:
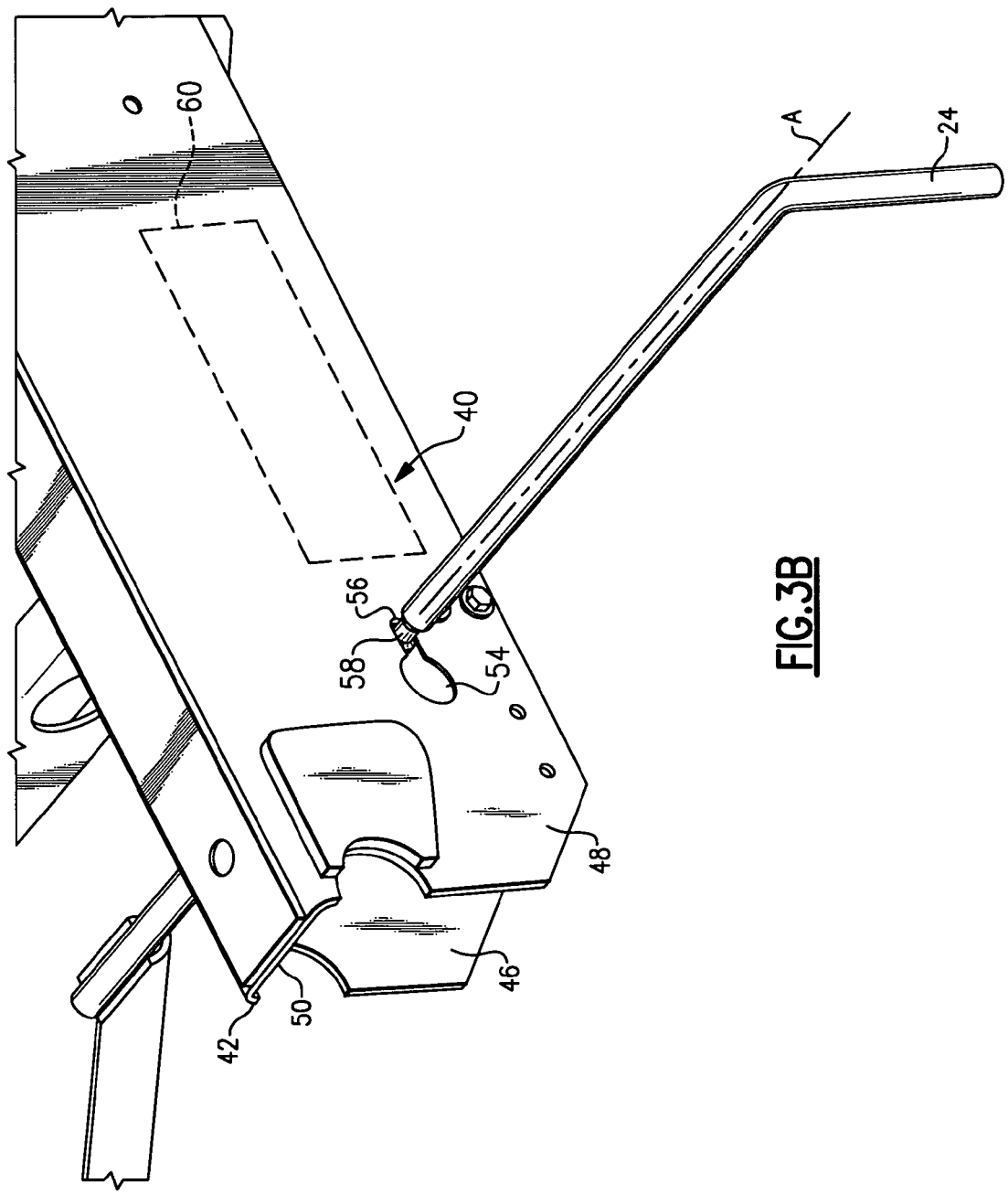
FIG. 3B is similar to FIG. 3A but shows the handle in an unlocked position.

The release mechanism 40 is shown supported by a suspension side rail 42 with a bracket 44, however, other mounting structures could also be used. The suspension side rail 42 is shown formed as a U-shaped channel member having an inboard wall 46 and an outboard wall 48 that are interconnected by a laterally extending wall 50 (FIGS. 3A-3B). Of course, other shapes can be used.

As shown in FIGS. 3A-3B, the handle 24 extends through a first opening 45 (FIG. 2) in the inboard wall 46 and a second opening 54 in the outboard wall 48. The second opening 54 includes a keyway or slot portion 56 that extends from the second opening 54 in a longitudinal direction along a length of the suspension side rail 42. When the pins 36, 36' are moved between extended (locked) and retracted (unlocked) positions the handle 24 moves along a first path defined by axis A. To hold the handle 24 in the unlocked position the handle 24 is pulled laterally, outwardly from the suspension side rail 42 along the axis A, and is moved in a longitudinal direction into the slot portion 56. Thus, the handle 24 is moved along a second path transverse to the first path to engage into the slot portion 56.

Figure 4:
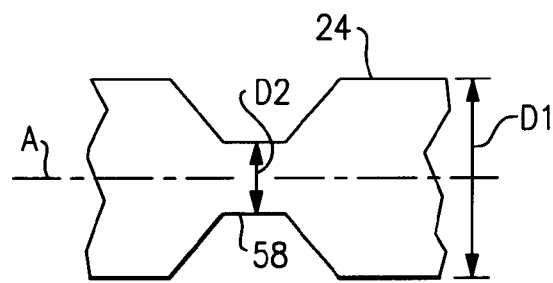
FIG. 4 is a side view of a portion of the handle.

As shown in FIG. 4, the handle 24 is defined by a main diameter D1 and includes a narrow or neck portion 58 defined by a second diameter D2 that is less than the main diameter D1. As the handle 24 is moved from the locked position toward the unlocked position, the handle 24 cannot enter the slot portion 56 (see FIG. 3A) because the main diameter D1 is greater than a width of the slot portion 56. When the handle 24 is in the unlocked position, with the pins 36, 36' disengaged, the neck portion 58 is aligned with the slot portion 56. The second diameter D2 is less than the width of the slot portion 56, which allows the handle 24 to be moved into, and held within, the slot portion 56 (shown in FIG. 3B). This allows the trailer slider to be moved to a desired position.

Figure 5:
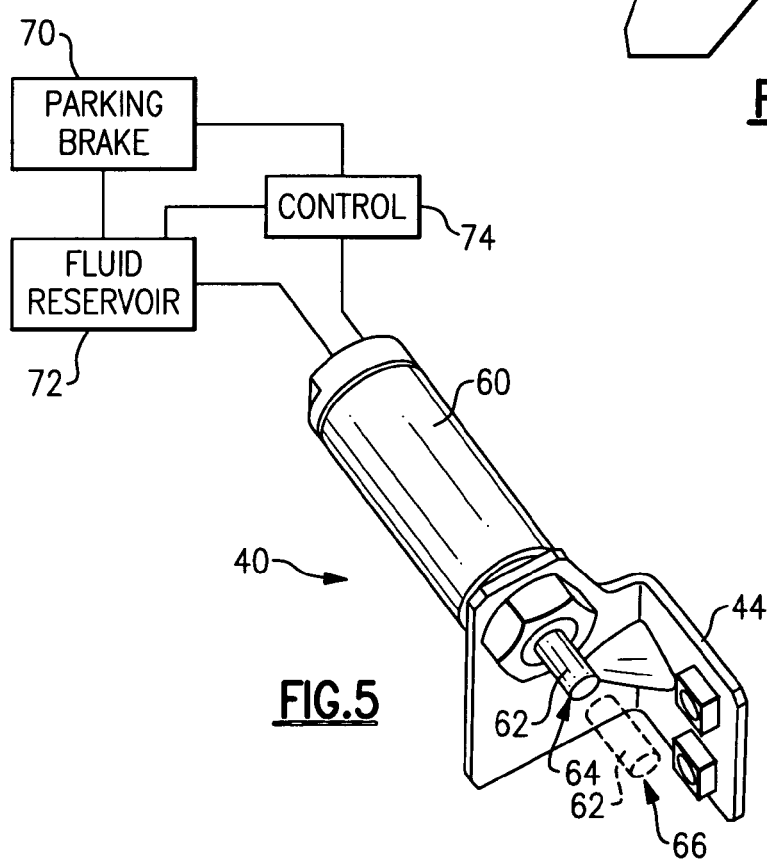
FIG. 5 is a schematic view of the release mechanism, parking brake, and associated control system.

The release mechanism 40 is used to prevent an operator from driving off with the handle 24 in the unlocked position. As shown in FIG. 5, the release mechanism comprises a cylinder 60 with a shaft 62. In one example, the cylinder 60 is an air cylinder however, other types of fluid cylinders could also be used. The shaft 62 is extended from an initial position, indicated at 64 to an extended position, indicated at 66. The cylinder 60 is shown as being attached to the suspension side rail 42 (FIG. 2) with bracket 44, however, the cylinder 60 could also be mounted to other suspension components. Additionally, while a cylinder 60 is shown, an air spring, service chamber, or similar mechanism could also be used to provide an actuating force.

The cylinder 60 is activated to move from the initial position 64 to the extended position 66 in response to a parking brake release signal. When the parking brake release signal is generated, the shaft 62 extends to engage the handle 24 (FIG. 2). As the shaft 62 moves to the fully extended position 66, the shaft 62 moves the handle 24 out of the slot portion 56 (FIG. 3A). Once the handle 24 is out of the slot portion 56, biasing members in the cages 34 (FIG. 1) force the pins 36, 36' into associated holes to lock the trailer slider in place.

A parking brake 70 is fluidly connected to a fluid reservoir 72. A parking brake spring chamber (not shown) is pressurized to hold the parking brake 70 in a released position. When the parking brake 70 is applied, pressure is released from the parking brake spring chamber and a resilient biasing member (not shown) applies the parking brake as known. When the parking brake 70 is to be released, the parking brake spring chamber is re-pressurized until a spring force of the resilient biasing member is overcome. The structure and operation of the parking brake 70 itself is known and will not be discussed in further detail.

Figure 6:
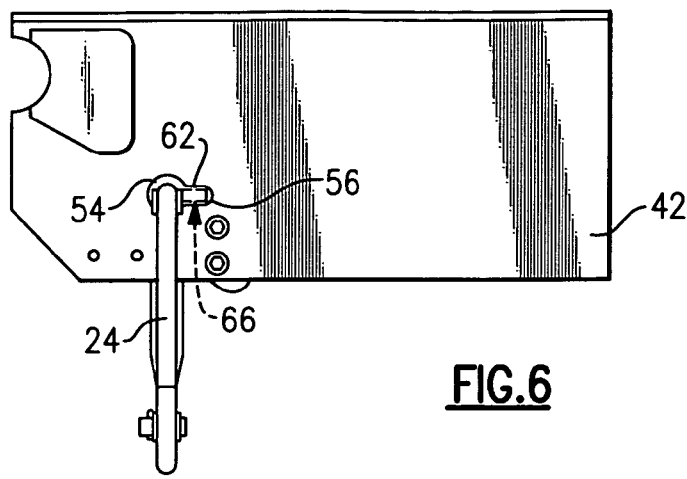
FIG. 6 is a side view of the locking system and release mechanism with the handle in a locked position.

When the parking brake release signal is generated in response to a parking brake release command, the parking brake spring chamber is pressurized to release the parking brake 70. The cylinder 60 is simultaneously pressurized (FIG. 5), which extends the shaft 62. As the shaft 62 extends, the shaft 62 engages and forces the handle 24 out of the slot portion 56, as shown in FIG. 6. Of course, the operator may already have returned the handle to the locked position. This invention provides a way of ensuring it is so moved, if the operator has forgotten. The cylinder 60 is shown connected to a fluid reservoir that is common with the parking brake 70, i.e. the fluid reservoir 72; however, the cylinder 60 could also be connected to a separate or different fluid supply.

A control mechanism 74 (FIG. 5) cooperates with the fluid reservoir 72, parking brake 70, and cylinder 60 to supply fluid to the parking brake 70 and cylinder 60 under predetermined conditions as needed. The control mechanism 74 includes valves, connectors, fluid lines, etc. to ensure that fluid is delivered in a controlled manner to the parking brake 70 and cylinder 60.

The cylinder 60 remains pressurized, with the shaft 62 fully extended, until the parking brake 70 is applied. Thus, if the operator does not apply the parking brake 70 and attempts to move the handle 24 to the unlocked position, the shaft 62 will prevent the handle 24 from moving into the slot portion 56. Once the parking brake 70 is applied, the pressure in the cylinder 60 is released and the shaft 62 retracts to allow the handle 24 to move into the slot portion 56. This allows trailer slider adjustment as discussed above. The release mechanism 40 reliably ensures that the handle 24 will be moved out of the unlocked position prior to vehicle movement Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailer slider assembly comprising:
   a handle adapted to move a trailer slider locking mechanism between an unlocked position and a locked position;
   a suspension side rail having a feature that receives said handle to hold the trailer slider locking mechanism in said unlocked position; and
   a release mechanism that releases said handle from said feature in response to a release of a parking brake.

2. The trailer slider assembly according to claim 1 wherein said feature comprises a slot formed in said suspension side rail.

3. The trailer slider assembly according to claim 2 wherein said handle is movable along a first path between unlocked and locked positions and wherein said handle is movable along a second path transverse to said first path to enter said slot.

4. The trailer slider assembly according to claim 2 including an opening extending through said suspension side rail for receiving said handle, and wherein said slot extends in a longitudinal direction from said opening along said suspension side rail.

5. The trailer slider assembly according to claim 4 wherein said handle includes a main portion defining a first diameter and a neck portion defining a second diameter that is less than said first diameter, and wherein said first diameter is greater than a width of said slot and said second diameter is less than the width of said slot.

6. The trailer slider assembly according to claim 5 wherein said neck portion is only received within said slot when the parking brake is in an applied condition.

7. The trailer slider assembly according to claim 1 wherein said release mechanism comprises an air cylinder having an extendible shaft.

8. The trailer slider assembly according to claim 7 wherein the parking brake is pressurized to move the parking brake from an applied position to a released position, and wherein said air cylinder is simultaneously pressurized such that said extendible shaft engages said handle to release said handle from said feature allowing the trailer slider locking mechanism to return to said locked position.

9. The trailer slider assembly according to claim 1 wherein said release mechanism prevents the trailer slider locking mechanism from moving to the unlocked position until the parking brake is applied.

10. The trailer slider assembly according to claim 1 wherein said release mechanism includes an extendible component that is extended to directly engage said handle if said trailer slider locking mechanism is in said unlocked position when said parking brake is pressurized such that said handle is released from said feature to allow the trailer slider locking mechanism to return to said locked position.

11. The trailer slider assembly according to claim 10 wherein said release mechanism comprises a cylinder that is simultaneously pressurized with said parking brake in response to a parking brake release command such that said extendible component is moved toward said handle.

12. The trailer slider assembly according to claim 1 wherein said handle extends through openings formed within inboard and outboard walls of said suspension side rail and wherein said release mechanism is mountable within an internal space defined between said inboard and outboard walls and adjacent to said handle.

13. A method for adjusting a trailer slider assembly comprising the steps of:
 (a) actuating a handle to unlock a trailer slider locking mechanism to move a trailer slider to a desired position;
 (b) generating a parking brake release signal; and
 (c) actuating a release mechanism to move the handle out of an unlock position to return the trailer slider locking mechanism to a locked condition in response to the parking brake release signal.

14. The method according to claim 13 wherein the trailer slider locking mechanism includes a handle and wherein step (a) includes moving the handle from a locked position to an unlocked position.

15. The method according to claim 14 wherein step (a) includes holding the handle in the unlocked position by moving the trailer slider handle into a retaining feature formed in a suspension rail.

16. The method according to claim 15 wherein the release mechanism includes an extendible member and wherein step (c) includes engaging the handle with the extendible member to move the handle out of the retaining feature in response to the parking brake release signal.

17. The method according to claim 15 including only moving the trailer slider locking mechanism to an unlocked position when a parking brake is applied.

18. The method according to claim 17 wherein the trailer slider locking mechanism includes a handle having a main body portion defined by a first diameter and a neck portion defined by a second diameter less than the first diameter, and wherein the retaining feature comprises an opening extending through the suspension rail and a slot extending longitudinally from the opening, and including only moving the neck portion into the slot when the parking brake is applied to hold the trailer slider in an unlocked position.

19. The method according to claim 13 including actuating a handle to move the trailer slider locking mechanism from the locked condition to an unlocked condition, retaining the handle in a feature formed within a suspension side rail when in the unlocked condition, extending an extendible component of the release mechanism to directly engage the handle if the trailer slider locking mechanism is in the unlocked condition when a parking brake is pressurized such that the extendible component forces the handle to move out of the feature to allow the trailer slider locking mechanism to return to the locked condition.

20. The method according to claim 19 wherein the release mechanism comprises a cylinder, and including simultaneously pressurizing a parking brake and the cylinder in response to the parking brake release signal such that the extendible component is moved in a direction toward the handle.

21. The method according to claim 13 including pressurizing parking brakes in response to step (b) to release the parking brakes and simultaneously generating a control signal to actuate the release mechanism to move the handle out of the unlock position such that trailer locking pins return to a pin locked position.

22. The method according to claim 21 wherein the control signal comprises a pressure signal that forces the handle out of the unlock position.

23. The method according to claim 22 wherein the release mechanism comprises a cylinder with an extendible shaft, and including pressurizing the cylinder to extend the extendible shaft to force the handle out of the unlock position and into a lock position.

24. The method according to claim 23 including pressurizing the cylinder until the parking brakes are re-applied such that if the parking brakes are not applied the extendible shaft prevents the handle from being moved to the unlock position, and releasing pressure from the cylinder when the parking brakes are applied to return the shaft to a non-extended position so that the handle can be moved into the unlock position.

25. The method according to claim 13 wherein the release mechanism includes an extendible member and including preventing the handle from being moved to the unlock position by holding the extendible member in an extended position to block movement of the handle from a lock position into the unlock position until a parking brake is applied.

* * * * *